United States Patent [19]
Ascolese

[11] Patent Number: 6,077,445
[45] Date of Patent: Jun. 20, 2000

[54] METHOD TO MINIMIZE CORROSION IN AQUEOUS SYSTEMS

[75] Inventor: Charles R. Ascolese, Warrington, Pa.

[73] Assignee: BetzDearborn Inc., Trevose, Pa.

[21] Appl. No.: 09/034,030

[22] Filed: Mar. 3, 1998

[51] Int. Cl.$^7$ ....................................................... C02F 1/50
[52] U.S. Cl. .............................. 210/746; 73/61.62; 73/86; 210/754; 210/764; 162/161; 324/700; 422/3
[58] Field of Search ..................... 210/696–701, 210/746, 764, 96.1, 754; 422/3; 73/61.62, 86; 324/700; 162/161

[56] References Cited

U.S. PATENT DOCUMENTS

| | | | |
|---|---|---|---|
| 4,654,208 | 3/1987 | Stockel et al. | 424/78 |
| 4,897,797 | 1/1990 | Free, Jr. et al. | 364/500 |
| 4,923,599 | 5/1990 | Bowers | 210/96.1 |
| 4,963,815 | 10/1990 | Hafeman | 324/715 |
| 4,999,116 | 3/1991 | Bowers | 210/709 |
| 5,045,213 | 9/1991 | Bowers | 210/709 |
| 5,236,673 | 8/1993 | Coakley et al. | 422/186.07 |
| 5,268,092 | 12/1993 | Eden | 210/96.1 |
| 5,332,494 | 7/1994 | Eden et al. | 210/96.1 |
| 5,332,556 | 7/1994 | Coakley et al. | 422/186.11 |
| 5,342,510 | 8/1994 | Eden et al. | 210/96.1 |
| 5,382,331 | 1/1995 | Banks | 204/153.14 |
| 5,484,549 | 1/1996 | Hei et al. | 252/103 |
| 5,547,584 | 8/1996 | Capehart | 210/669 |
| 5,567,444 | 10/1996 | Hei et al. | 426/616 |
| 5,576,481 | 11/1996 | Beardwood | 73/61.62 |
| 5,607,619 | 3/1997 | Dadgar et al. | 423/22 |
| 5,620,585 | 4/1997 | Dadgar et al. | 205/565 |
| 5,628,888 | 5/1997 | Bakhir et al. | 204/260 |
| 5,658,467 | 8/1997 | La Zonby et al. | 210/754 |
| 5,855,791 | 1/1999 | Hays et al. | 210/696 |

FOREIGN PATENT DOCUMENTS

| | | |
|---|---|---|
| 300651 | 1/1989 | European Pat. Off. . |
| 614079 | 2/1994 | European Pat. Off. . |

OTHER PUBLICATIONS

Rohrback Cosasco Systems, Inc., Corrosometer Probe Selection Guide—Bulletin #200.
Rohrback Cosasco Systems, Inc., Corrater Probe Selection Guide—Bulletin #400.
Rohrback Cosasco Systems, Inc., Corrosion Review.
BetzDearborn Inc.—Rohrback SCA–1 On–Line Corrosion Rate Instrument, 1997.

*Primary Examiner*—Peter A. Hruskoci
*Attorney, Agent, or Firm*—Greenblum & Bernstein, P.L.C.

[57] ABSTRACT

A method to minimize corrosion in aqueous systems while maintaining microbiological control in such systems is disclosed. This is achieved by regulating the feed of oxidizers with an oxidation-reduction potential (ORP) signal, while incorporating corrosion information provided by an on-line corrosion meter.

7 Claims, No Drawings

METHOD TO MINIMIZE CORROSION IN AQUEOUS SYSTEMS

FIELD OF THE INVENTION

The present invention relates to a process and apparatus to minimize corrosion while maintaining microbiological control in industrial aqueous systems.

BACKGROUND OF THE INVENTION

Microbiological fouling has long been a problem with industrial aqueous systems. Aqueous industrial systems in which microbiological fouling can be a problem include industrial cooling water systems, in particular. However, microbiological fouling may be present and may cause problems in any aqueous containing system.

Microbiological fouling may result from the presence of any of a variety of organisms in an aqueous system. Among the organisms that are important in microbiological fouling are algae, fungi, and a variety of bacterial organisms. Such organisms may be introduced to aqueous industrial systems and intake water used in the system, from the environment, such as from the air or water, which could include, for example, an input of a component of foreign composition into the system or the introduction of contaminated equipment into a system.

Bacteria form a major component of microbiological fouling in aqueous systems. Bacteria can grow in almost any environment. Bacteria are loosely classified according to the environment in which they typically grow. Bacteria which are typically associated with microbiological fouling include anaerobic, facultative anaerobic, and aerobic bacteria. Anaerobic bacteria are particularly significant in microbiological fouling.

Among the problems associated with microbiological fouling are a loss of efficiency, corrosion of parts of aqueous systems, an increase in friction in water flowing through the system and a resulting decrease in efficiency and increase in required energy to move water through the system, as well as an increase in slime and inorganic deposition. An increase in material in the aqueous system can also decrease the efficiency of the system and clog the system by taking up volume within the system.

Once a fouling layer is detected and determined to be microbiological in nature, methods are used to control and eliminate the organisms responsible for the fouling. A variety of methods may be used to control microbial growth. Such methods may include changes to the conditions within the aqueous system and/or use of compounds having a microbiocidal effect.

According to one treatment protocol, the organisms causing microbiological fouling of aqueous systems are controlled using a variety of microbiocides. For instance, microbiocides such as chlorine or other known biocides may be injected into the system to control growth of microbiological organisms. The specific microbes requiring control affect the selection and method of application of the microbiocides used.

The addition of oxidizing biocides is routinely controlled through use of online oxidation-reduction potential (ORP) meters; however, this control is insensitive to potentially corrosive effects of high halogenation rates, which may be necessary to reach a target ORP range. Incorporating a corrosion rate signal would set an upper limit for halogenation (e.g., chlorination or bromination).

SUMMARY OF THE INVENTION

The present invention provides a method and apparatus to minimize corrosion while maintaining microbiological control in industrial aqueous (e.g. cooling water, pulping or papermaking) systems. This is achieved by regulating the feed of oxidizers with an oxidation-reduction potential (ORP) signal, while incorporating corrosion information provided by an on-line corrosion rate meter.

DETAILED DESCRIPTION OF THE PREFERRED EMBODIMENTS

The present invention provides an apparatus and method for minimizing corrosion in aqueous systems. The ORP signal regulates the feed of oxidizers, while an on-line corrosion rate meter incorporates corrosion information.

The method of the present invention is directed to the minimizing of corrosion in an aqueous system to which an effective amount of an oxidizing biocide is added for the control of microbiological growth, and comprises:

(a) establishing a target oxidation-reduction potential (ORP) level;

(b) establishing a maximum corrosion rate;

(c) continuously measuring the ORP level and the corrosion rate in the system;

(d) comparing the ORP level to the target ORP level;

(e) comparing the corrosion rate to the maximum corrosion rate; and (f) adding an effective amount of a non-oxidizing biocide to said system, while reducing the amount of oxidizing biocide added when the maximum corrosion rate is reached.

By target ORP level, it is meant that level where the maximum effective amount of microbiological control is achieved by a particular biocide (about 450–700 mV). By maximum corrosion rate, it is meant the upper permissible limit of corrosion (about 3.0 mpy for mild steel, 0.3 mpy for copper and copper alloys).

ORP is a measurement of the electron exchange potential which occurs in an ionic reaction. Since most heat transfer systems, including cooling tower systems, are constructed of metal, utilizing ever-changing water, there typically is an undesired equilibrium created. The ORP measurement allows control of the electrochemical equilibrium. Chemical equilibria determine whether the stable form of a material is soluble or insoluble. If soluble species of material are stable, it is possible for a metal to rapidly corrode into aqueous forms. If insoluble species of material are stable, there is a tendency to form a scale, inhibiting corrosion, but inducing "under scale" corrosion. Both corrosion and scale are undesirable conditions in a cooling tower system, since degradation of the system operation occurs when either of these conditions are present to any substantial extent. Details of utilizing the ORP signal are disclosed in U.S. Pat. No. 5,268,092, incorporated by reference herein.

The corrosion rate meter signal may be determined using commercially available instruments, such as described in U.S. Pat. No. 5,576,481, also incorporated by reference herein.

The corrosion rate, change in corrosion rate and maximum corrosion rate are all measured utilizing linear polarization resistance, as described in the '481 patent referred to above. The ORP level is measured utilizing any of the established means present in the art.

The inputs to a device for integrating input signals (a processor/integrator, such as that disclosed in U.S. Pat. No. 4,897,797) would be an ORP signal, a corrosion rate meter signal, and biomonitoring measurement as a fouling indicator (e.g., ATP, or adenosine triphosphate, levels in mg/ml) which may be measured using the BIOSCAN system, available from BetzDearborn Inc. The outputs would include a comparison of the ORP level to the target ORP range, a comparison of the corrosion rate to a predetermined acceptable maximum, and alarming for any corrosion rate over the maximum. Output would also include a signal for oxidizer control, which causes a reduction in oxidizer feed rate when a corrosion rate alarm is activated. Referring to the biomonitoring signal at that time, oxidizer feed will then be reduced, and feed of a noncorrosive, nonoxidizing biocide or biodispersant triggered to maintain biocontrol.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. In an aqueous system to which an effective amount of an oxidizing biocide is added for the control of microbiological growth, a method for minimizing the formation of corrosion in said system, which comprises:

(a) establishing a target oxidation-reduction potential (ORP) level;
   (b) establishing a maximum corrosion rate;
   (c) continuously measuring the ORP level and the corrosion rate in said system;
   (d) comparing the ORP level to the target ORP level to regulate the addition of said oxidizing biocide;
   (e) comparing the corrosion rate to the maximum corrosion rate; and
   (f) adding an effective amount of a non-oxidizing biocide to said system, while reducing the amount of oxidizing biocide added when the maximum corrosion rate is reached, to maintain said control of microbiological growth and said corrosion below the maximum corrosion rate.

2. The method as recited in claim 1 wherein said corrosion rate is measured utilizing linear polarization resistance.

3. The method as recited in claim 1 wherein said maximum corrosion rate is measured utilizing linear polarization resistance.

4. The method as recited in claim 1 wherein said aqueous system is a cooling water system.

5. The method as recited in claim 1 wherein said aqueous system is a pulping or papermaking system.

6. The method as recited in claim 1 wherein said maximum corrosion rate is about 3 mpy.

7. The method as recited in claim 1 wherein said target ORP level is about 450–700 mV.

* * * * *